United States Patent [19]
Nakamura

[11] Patent Number: 4,807,923
[45] Date of Patent: Feb. 28, 1989

[54] WINDOW SEAL CONSTRUCTION FOR SASHLESS DOOR

[75] Inventor: Shigeru Nakamura, Odawara, Japan

[73] Assignee: Nissan Motor Co., Ltd., Yokohama, Japan

[21] Appl. No.: 30,379

[22] Filed: Mar. 26, 1987

[30] Foreign Application Priority Data

Mar. 28, 1986 [JP] Japan ................................. 61-69884
Mar. 31, 1986 [JP] Japan ................................. 61-72681
Apr. 1, 1986 [JP] Japan ................................. 61-74825

[51] Int. Cl.$^4$ ............................................. B60J 1/17
[52] U.S. Cl. ..................................... 296/146; 296/201; 49/498
[58] Field of Search ................ 296/146, 201; 49/498, 49/475, 485

[56] References Cited

U.S. PATENT DOCUMENTS 4,047,751 9/1977 Koike ................................. 296/146

FOREIGN PATENT DOCUMENTS 50-66323 6/1975 Japan .
130819 8/1982 Japan ................................. 296/146
186516 11/1982 Japan .
214411 12/1983 Japan .

Primary Examiner—Robert R. Song
Attorney, Agent, or Firm—Foley & Lardner, Schwartz, Jeffery, Schwaab, Mack, Blumenthal & Evans

[57] ABSTRACT

A window seal construction for a sashless type door is disclosed, in which an elongate stopper of resiliently deformable material is arranged outside of a window pane in raised position in a manner to lie on a given way along which the upper edge of the window pane in raised position moves outwardly when a lower pressure area is produced at the outer surface of the vehicle body under high speed cruising of the vehicle.

13 Claims, 5 Drawing Sheets

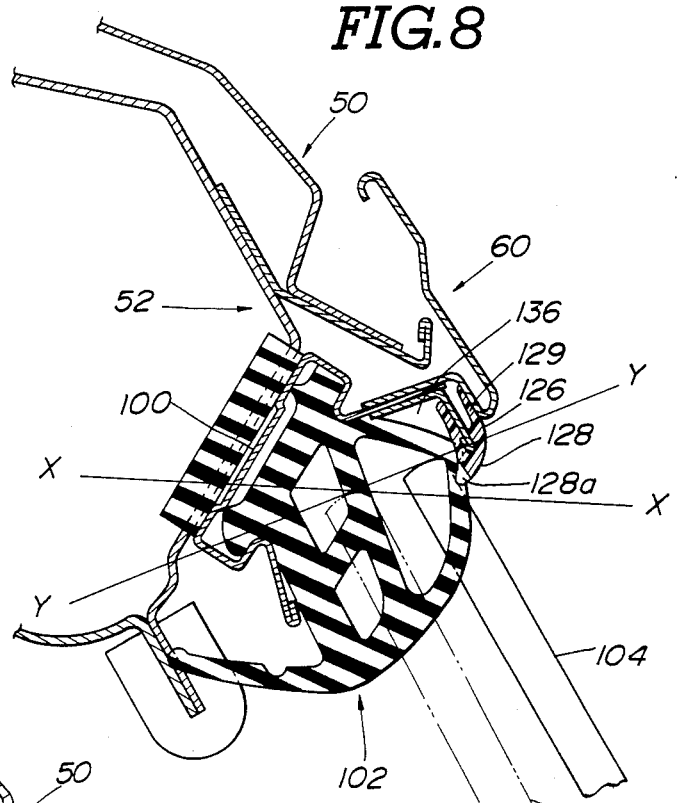
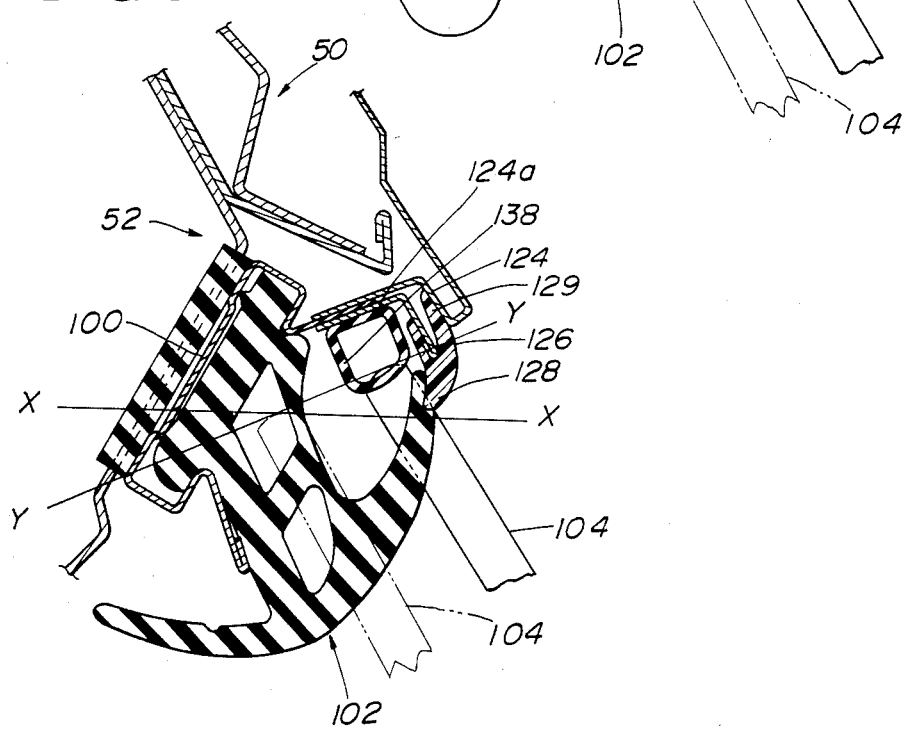

WINDOW SEAL CONSTRUCTION FOR SASHLESS DOOR

BACKGROUND OF THE INVENTION

1. Field of the Invention

The present invention relates in general to a window seal construction of a motor vehicle for making a seal about the periphery of a door window pane when the door is in its closed position, and more particularly to a window seal construction applied to a motor vehicle having doors of a sashless type.

2. Description of the Prior Art

As is known, under high speed cruising of the vehicle, there is produced a lower pressure area about the outer surface of the moving vehicle as compared with the pressure in the passenger room. The lower pressure area thus produced tends to bias the window pane of the door outwardly, so that it sometimes occurs that the window pane is moved outwardly making a seal about the periphery of the window pane inoperative. This phenomenon is much more remarkable in case of a motor vehicle having doors of a sashless type wherein no frame support or sash for the window pane is provided to the door proper.

In view of the above-mentioned undesirable outward movement of the window pane, various attempts have been made in modern motor vehicles, especially vehicles having the sashless type doors, in order to stop the movement. However, as will be described hereinafter, some of them have failed to get a satisfied result because of appearance of a secondary defect which is directly caused by the attempts made.

SUMMARY OF THE INVENTION

It is therefore an essential object of the present invention to provide a window seal construction for a sashless door, which stops softly the undesirable outward movement of the window pane without producing secondary defects.

It is an object of the present invention to provide a window seal construction for a sashless door, which suppresses an excessive outward movement of the window pane without making any noise trouble even under high speed cruising of the vehicle.

According to the present invention, there is provided an improved window seal construction for a motor vehicle which has a side roof rail structure which bounds an upper side of a door opening, a sashless type door hinged to the vehicle to open or close the door opening, a window pane held by the door in a manner to move between raised and lowered positions, first means for causing an upper edge of the window pane in the raised position to move along a first given way when the door is normally swung to open or close the door opening, and second means for causing the upper edge of the window pane in the raised position to move outwardly along a second given way when a lower pressure area is created at the outer side of the vehicle. The improved window seal construction comprises an elongate weatherstrip secured to the side roof rail structure and extending along the same, the weatherstrip contacting sealingly with an upper peripheral portion of the window pane in the raised position upon closing of the door; a supporting member secured to the side roof rail structure and having an elongate flange portion which straddles the window pane in the raised position and extends along the side roof rail structure leaving a given space between the upper edge of the window pane in the raised position and the elongate flange portion of the supporting member; and an elongate stopper member of resiliently deformable material secured to the elongate flange portion of the supporting member and extending along the same, the stopper member being positioned to interfere with the second given way but not interfere with the first given way, so that when the upper edge of the window pane in the raised position is moved outwardly along the second given way, the outward movement is stopped by the stopper member establishing watertight sealing between the window pane and the elongate stopper member.

BRIEF DESCRIPTION OF THE DRAWINGS

FIG. 5 to 10 are sectional views similar to FIG. 4, but showing second, third, fourth, fifth, sixth and seventh embodiments of the present invention.

DESCRIPTION OF A CONVENTIONAL WINDOW SEAL CONSTRUCTION

Figure 2:
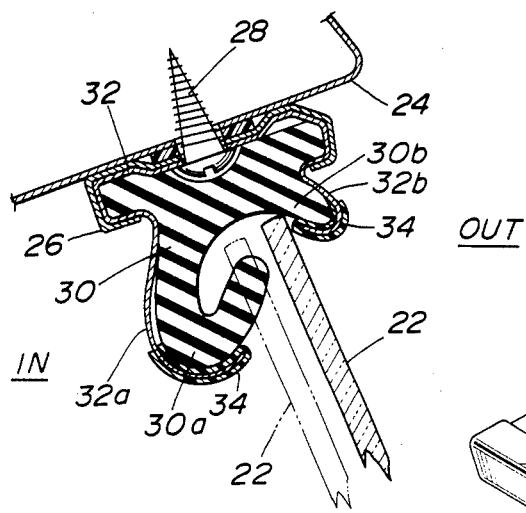
FIG. 2 is an enlarged sectional view taken along the line II—II of FIG. 1.
Figure 3:
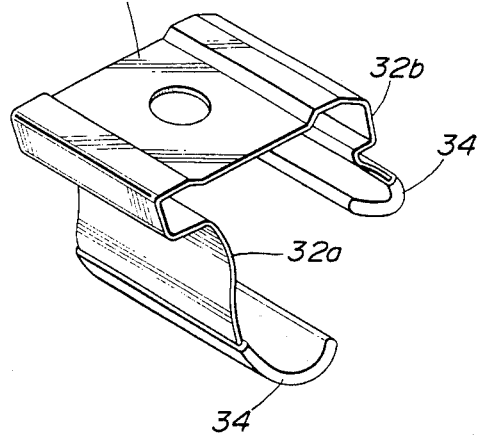
FIG. 3 is a perspective view of a clip employed in the conventional window seal construction.

Prior to describing in detail the invention, one conventional window seal construction for sashless doors will be described with reference to FIGS. 1 to 3 in order to clarify the task of the invention.

Figure 1:
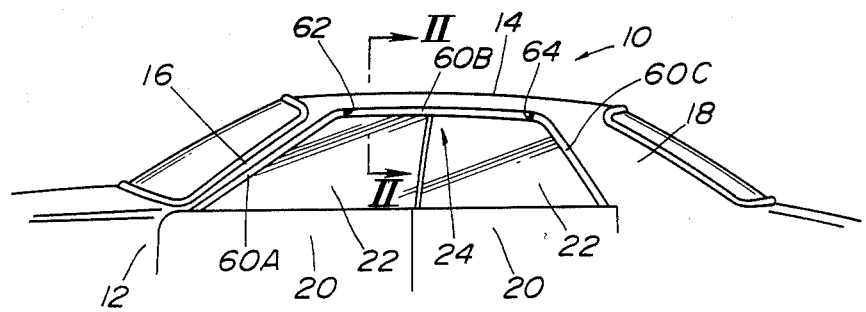
FIG. 1 is a partial, side view of a passenger motor vehicle having a conventional window seal construction for side doors of a sashless type.

Referring to the drawings, particularly FIG. 1, a passenger motor vehicle 10 is shown to which the conventional window seal construction for sashless doors are practically applied. The motor vehicle 10 shown comprises generally side panels 12, a roof 14, front pillars 16, rear pillars 18 and side doors 20. Each side panel 12 has a door opening (no numeral) in which the front and rear side doors 20 are received having their front ends hinged to solidly-built parts of the vehicle in a conventional manner.

The doors 20 are of a so-called "sashless type" wherein the door proper has no frame support for a window pane 22 in raised position. Thus, in the sashless type door, the window pane 22 in the raised position is unsupported against possible lateral movement. Although not shown, a conventional window regulator is mounted in the door 20 for carrying out upward and downward movement of the window pane 22 relative to the door 20.

As is understood from FIG. 1, the front pillar 16, the roof 14 and the rear pillar 18 constitute a side roof rail structure 24 which bounds an upper side of the door opening. As is seen from FIG. 2, on the side roof rail structure 24 is mounted an elongate weatherstrip retainer 26 by means of screws 28 (only one is shown). A weatherstrip 30 extends along the retainer 26 and is secured to the same. The weatherstrip 30 has two curled portions 30a and 30b projected toward the door opening. Suitable number of metal clips 32 (see FIG. 3) are connected through the screws 28 to the retainer 26 for assuring the connection of the weatherstrip 30 to the retainer 26. As shown, each clip 32 has two inwardly curled arms 32a and 32b which hold the curled portions 30a and 30b of the weatherstrip 30 respectively. The curled arms 32a and 32b of the clip 32 are coated with solid plastics for improving congeniality with the weatherstrip 30 made of rubber material or the like. This plastic coating further improves or facilitates the work of setting the weatherstrip 30 in the clip 32 because the sharp edges of the metal arms 32a and 32b are covered with the plastics.

The window seal construction as mentioned hereinabove has exhibited a satisfied result in achieving tight sealing about the periphery of the window pane 22 in the raised position even under high speed cruising of the vehicle. That is, when, during high speed cruising, the window pane 22 is forced to move outward from the position illustrated by a phantom line in FIG. 2 due to creation of a lower pressure area proximate the outer surface of the vehicle, the upper edge of the window pane 22, as illustrated by a solid line, is brought into resilient engagement with the outboard positioned curled portion 30b of the weatherstrip 30 achieving tightwater sealing therebetween.

However, this outward movement of the window pane 22 has sometimes caused an undesirable noise trouble which occurs when the upper edge of the window pane 22 collides against he rigid plastics 34 on the curled arm 32b of the clip 32. In fact, this trouble becomes much severe when the vehicle runs on a rough road.

DESCRIPTION OF THE INVENTION

In the following, improved window seal constructions according to the present invention will be described, which are free of the noise trouble encountered in the above-mentioned conventional one.

Figure 4:
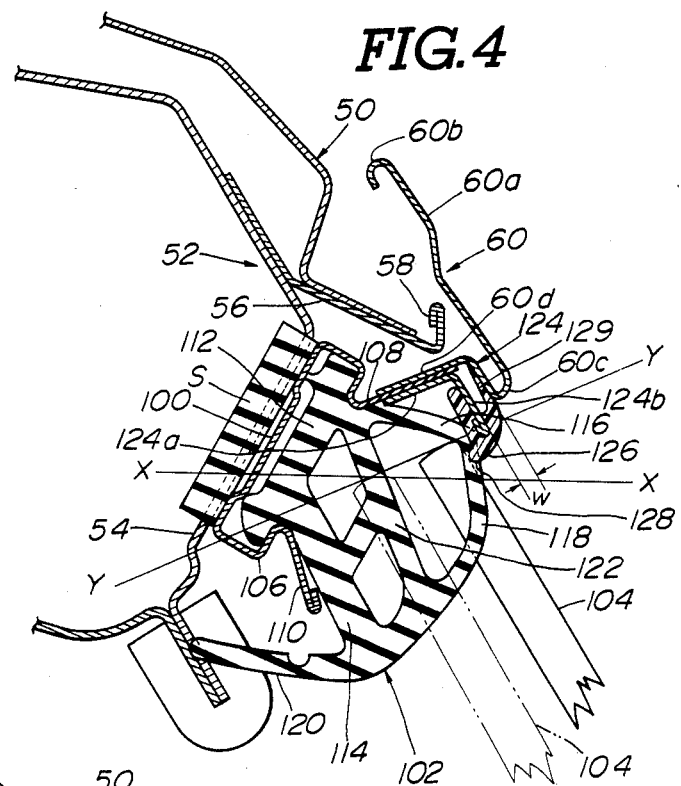
FIG. 4 is a sectional view of a window seal construction of a first embodiment of the present invention, showing the part corresponding to that of FIG. 2.

Referring to FIG. 4, there is shown a window seal construction of a first embodiment of the present invention, which is applied to a motor vehicle having doors of the sashless type. Designated by numeral 50 is a roof of the vehicle which has a side roof rail structure 52. The side roof rail structure 52 bounds an upper side of a door opening which is formed in each side panel of the vehicle. The side roof rail structure 52 comprises a flat portion 54 which extends along the longitudinal length of the vehicle. The side edge of the roof 50 is connected to the structure 52 through an elongate bracket 56 which has at its outboard end a drip channel construction 58. The drip channel construction 58 catches rain water which runs down on the roof 50. The drip channel construction 58 is concealed by a drip mold 60 (or garnish) for improving the external appearance of the upper peripheral portion of the door opening. The drip mold 60 comprises an elongate major portion 60a with inwardly curled side portions 60b and 60c, and an elongate flange portion 60d extending from the curled side portion 60c. As will be described hereinafter, the drip mold 60 is connected to the side roof rail structure 52 through a weatherstrip retainer 100. The weatherstrip retainer 100 is secured to the flat portion 54 of the side roof rail structure 52 with an interposal of sealing members therebetween and extends along the structure 52. A weatherstrip 102 extends along the retainer 100 and is secured to the same.

A window pane 104 is movable upward and downward between its raised position as illustrated by a phantom line and its lowered position in the door proper by means of a conventional window regulator mounted in the door. It is to be noted that the line X—X denotes the way along which the upper end of the window pane 104 travels when the door with the window pane 104 in raised position is swung to open or close relative to the door opening, while, the line Y—Y denotes the way along which the upper end of the window pane 104 travels when the window pane 104 is forced to move outwardly due to creation of the lower pressure area at the outer surface of the vehicle during high speed cruising of the vehicle.

The weatherstrip retainer 100 comprises a channel portion 106 seated on the flat portion 54 of the side roof rail structure 52, and two outwardly inclined wall portions 108 and 110. The upper inclined wall portion 108 has the afore-mentioned flange portion 60d of the drip mold 60 secured thereto.

The weatherstrip 102 includes an elongate hollow resiliently deformable member, which comprises a base portion 112 having a generally rectangular cross section, an inner side portion 114 extending substantially downwardly from the base portion 112, an outer side portion 116 extending substantially outwardly from the base portion 112, a lobe-like portion 118 extending from the outer side portion 116 to the leading end of the inner side portion 114, an inside lip 120 extending inwardly from the lobe-like portion 118 and a web portion 122 of generally Y-shaped cross section having three leds (no numerals) connected to the base portion 112, the inner side portion 114 and the lobe-like portion 118. With the web portion 122, three elongate chambers (no numerals) are defined in the weatherstrip 102, as is seen from the drawing. The base portion 112 of the weatherstrip 102 is snugly received in the channel portion 106 of the retainer 100 having the inner side portion 114 supported by the lower inclined wall portion 110 of the retainer 100.

An elongate flange member 124 of generally L-shaped cross section, which thus comprises first and second wall portions 124a and 124b, is secured at the first wall portion 124a to the upper inclined wall portion 108 of the retainer 100 and extends along the same. As is seen from the drawing, the connection of the flange member 124 to the wall portion 108 is so made that the second wall portion 124b extends substantially in parallel with the major surface of the window pane 104 in the raised position. It is to be noted that the lower curled side portion 60c of the drip mold 60 is spaced from the second wall portion 124b of the flange member 124 by a distance of W.

An elongate stopper member 126 of resiliently deformable material, such as soft plastics or the like, is fixed to the second wall portion 124b of the flange member 124 and extends along the same. The stopper member 126 has at its lower end an integral lip portion 128 which projects inward, that is, toward the weatherstrip 102. The stopper member 126 has further an outwardly projected lip portion 129 which is thrusted into the space (W) defined between the second wall portion 124b of the flange member 124 and the lower curled side portion 60c of the drip mold 60.

As is seen from the drawing, the stopper member 126 is positioned to interfere with the way Y—Y, but not interfere with the other way X—X. Thus, the upper edge of the window pane 104 in the raised position does not collide with the stopper member 126 when the door is moved to its open or close position. However, when, with the door closed, the window pane 104 is forced to move outward due to creation of the lower pressure area at the outer surface of the vehicle body during high speed cruising of the vehicle, the outward movement of the window pane 104 is stopped, at the position illustrated by a solid line, by the stopper member 126 to achieve watertight sealing between the window pane 104 and the stopper member 126. It is to be noted that when the vehicle is at a standstill or runs at a low speed, the window pane 104 assumes its normal raised position as illustrated by the phantom line.

Because the stopper member 126 is made of soft materials, the unavoidable collision of the window pane 104 against the stopper member 126 does not produce undesirable noise. Furthermore, since the stopper member 126 is arranged to extend entirely along the side roof rail structure 52, the contact between the window pane 104 and the stopper member 126 is made with larger contacting area thereby reducing or minimizing pressure applied to the stopper member 126. This is advantageous in reducing the undesirable permanent set of the stopper member made of soft plastics or the like. Because of the provision of the lip portion 128 of the stopper member 126, the sealing effect of the stopper member 126 to the window pane 104 is improved. Furthermore, with the other lip portion 129 plugged in the clearance (W), the clearance (W) is protected from attack of water thereby protecting the welded metal portions, such as the parts denoted by numerals 60d, 108 and 124a, from rusting.

Figure 5:
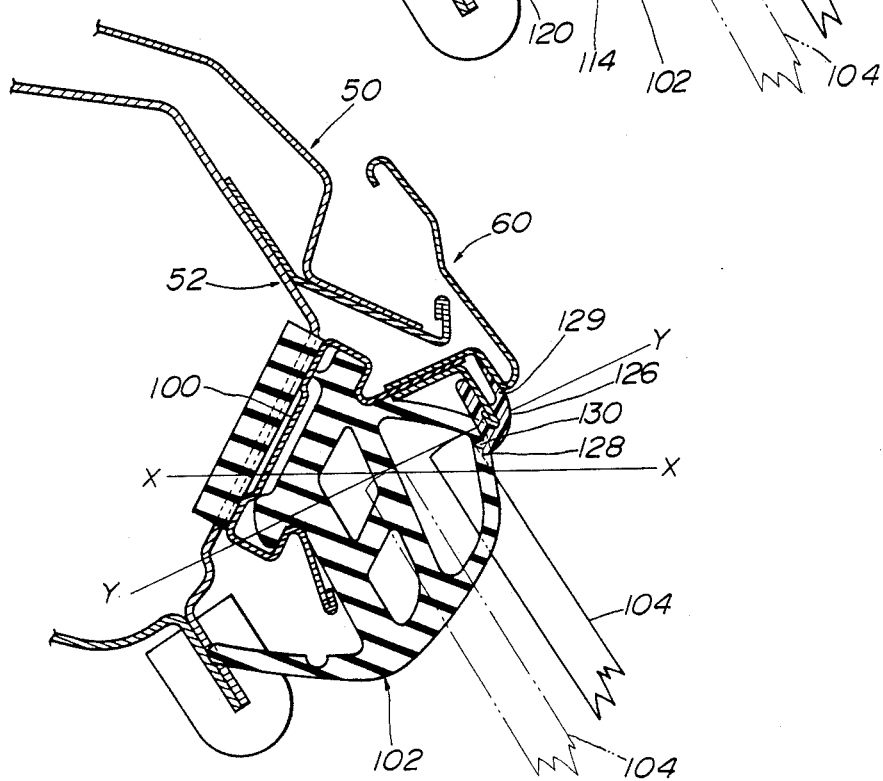

Referring to FIG. 5, there is shown a second embodiment of the present invention. Throughout the drawings from FIGS. 5 to 10, the same reference numerals as those used in FIG. 4 designate the corresponding parts. In the second embodiment of FIG. 5, two integral lip portions 128 and 130 are provided by the stopper member 126 in addition to the outwardly projected lip portion 129.

Figure 6:
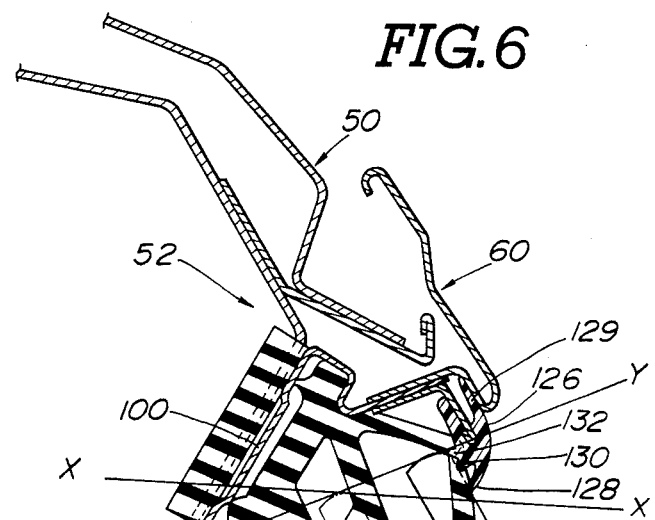

Referring to FIG. 6, there is shown a third embodiment of the present invention. In this embodiment, three integral lip portions 128, 130 and 132 are provided by the stopper member 126 in addition to the outward lip portion 129.

Figure 7:
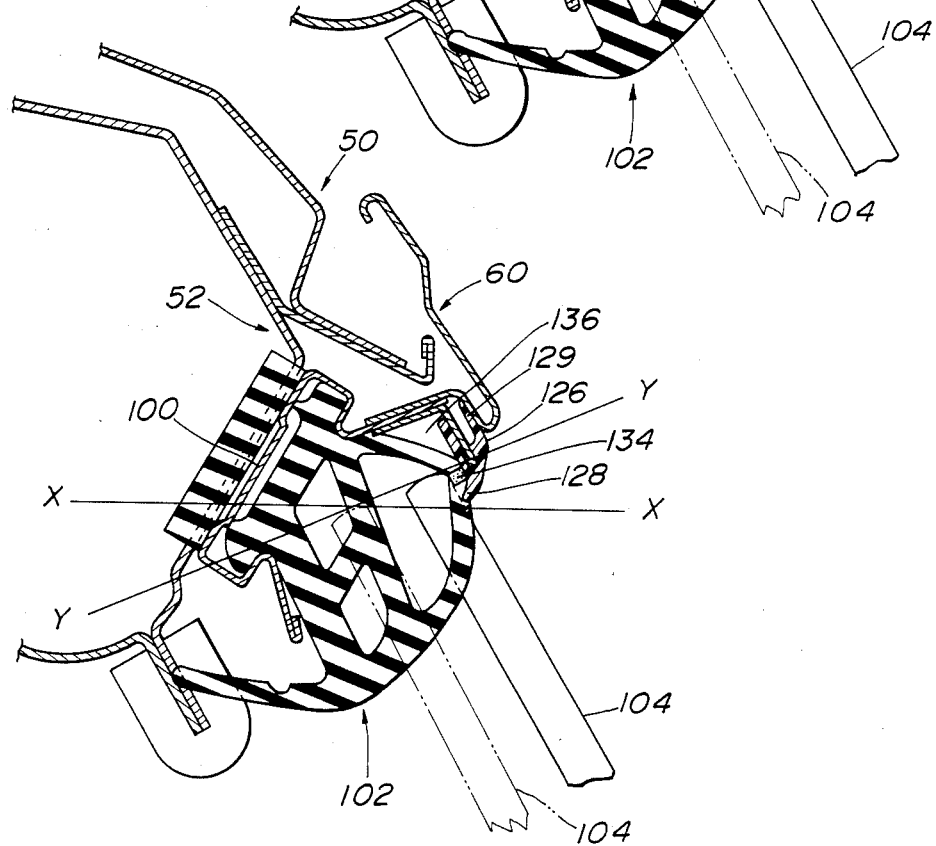

Referring to FIG. 7, there is shown a fourth embodiment of the present invention. In this embodiment, a sponge strip 134 is fixed to the stopper member 126 at the position slightly above the lip portion 128 and extends along the same. Due to the porous and flexible construction, the sponge strip 134 is capable of absorbing water. Thus, even when rain water leaks between the lip portion 128 and the window pane 104, it can be absorbed by the sponge strip 134 thereby preventing the water from entering into a chamber 136 which is defined by the flange member 124 and the weatherstrip 102. This is advantageous in that if any water is kept contained in the chamber 136, the inward movement of the window pane 104, which occurs during the vehicle cruising, causes the water to fall down on the outer surface of the window pane 104 thereby staining the same. If desired, a plurality of sponge pieces may be arranged at intervals in place of the sponge strip 134.

Referring to FIG. 8, there is shown a fifth embodiment of the present invention. This embodiment is similar to the afore-mentioned first embodiment of FIG. 4 except that the lip portion 128 in the fifth embodiment is formed with a plurality of cuts 128a along the length thereof. With these cuts 128a, the undesirable water holding phenomenon of the chamber 136 does not occur.

Referring to FIG. 9, there is shown a sixth embodiment of the present invention. As is seen from the drawing, the weatherstrip 102 of this sixth embodiment has no part which corresponds to the outer side portion 116 employed in the second to fifth embodiments. Thus, only two elongate chambers (no numerals) are defined in the weatherstrip 102. In place of the part, however, a resiliently deformable hollow strip 138 is fixed to the first wall portion 124a of the flange member 124 and extends along the same. The strip 138 is so sized and arranged that when the window pane 104 assumes the outermost sucked position as illustrated by a solid line, the strip 138 contacts sealingly with the upper periphery of the window pane 104.

Figure 10:
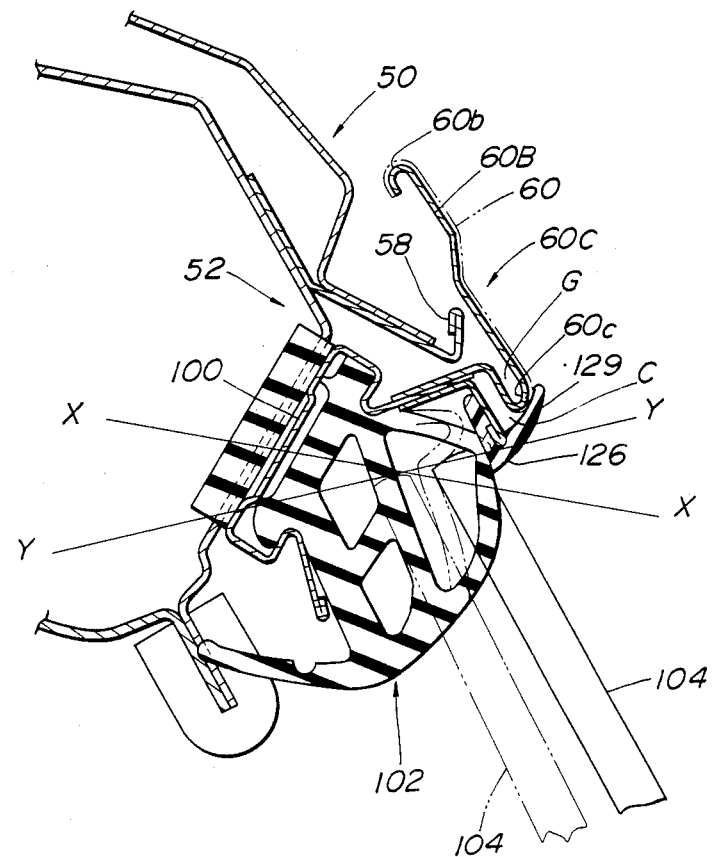

Referring to FIG. 10, there is shown a seventh embodiment of the present invention. For ease of description on this embodiment, the construction of the drip mold 60 will be further explained with reference to FIGS. 1 and 10. As is seen from FIG. 1, the drip mold 60 consists of three segments 60A, 60B and 60C which are joined to one another at portions denoted by numerals 62 and 64. This means that any water in the gutter G defined by the lower curled side portion 60c of the drip mold 60 will leak through clearances which are inevitably provided in the joined portions 62 and 64. Thus, if no measure is provided, the leaking water would soil the outer surface of the window pane 104 in the raised position. This problem is solved by the seventh embodiment.

In the seventh embodiment of FIG. 10, the outwardly projected lip portion 129 is made relatively thick in construction and resiliently contacted to the outer side of the lower curled side portion 60c of the drip mold 60. With this arrangement, the water leaking from the gutter G is collected in a channel C defined by the lip portion 129, and thereafter, the water flows forward or rearward in the channel C and finally drains away from a forward or rearward end of the lip portion 129. Thus, the window pane 104 is protected from being soiled by the water.

What is claimed is:

1. In a motor vehicle having a side roof rail structure which bounds an upper side of a door opening, a sashless type door hinged to the vehicle to open and close the door opening, a window pane held by said door in a manner to move between raised and lowered positions, first means for causing an upper edge of said window pane in the raised position to move along a first direction when said door is normally swung to open or close the door opening, and second means for causing the upper edge of said window pane in the raised position to move outwardly along a second direction when a lower pressure area is created at the outer surface of the vehicle, a window seal construction which comprises:

an elongate weatherstrip secured to said side roof rail structure and extending along the same, said weatherstrip contacting sealingly with an upper peripheral portion of the window pane in the raised position upon closing the door;

a supporting member secured to said side roof rail structure and having an elongate flange portion which straddles the window pane in the raised position and extends along the side roof rail structure leaving a space between the upper edge of the window pane in the raised position and the elongate flange portion of said supporting member; and an elongate stopper member of resiliently deformable material secured to said elongate flange portion of the supporting member and extending along the same, said stopper member being positioned to interfere with said second direction but not interfere with said first direction, so that when the upper edge of the window pane in the raised position is moved outwardly along the second direction, the outward movement is stopped by said stopper member establishing watertight sealing between the window pane and the elongate stopper member, said elongate stopper member being integrally formed with a specially deformable portion which is protected toward an upper peripheral portion of the window pane in the raised position to contact with the same.

2. A window seal construction as claimed in claim 1, in which said specially deformable portion is a single lip portion projected from a lower end of said stopper member.

3. A window seal construction as claimed in claim 1, in which said specially deformable portion comprises three lip portions projected from a lower end of said stopper member.

4. A window seal construction as claimed in claim 1, in which said specially deformable portion comprises three lip portions projected from a lower end of said stopper member.

5. A window seal construction as claimed in claim 2, further comprising a water absorptive strip which is fixed to the stopper member at a position slightly above said single lip portion with respect to the window pane in the raised position and extends along the stopper member.

6. A window seal construction a claimed in claim 5, in which said water absorptive strip is made of sponge.

7. A window seal construction as claimed in claim 2, in which said single lip portion is formed at its one side facing said window pane with a plurality of cuts along the length thereof.

8. A window seal construction as claimed in claim 2, further comprising a resiliently deformable hollow strip which is connected to said supporting member in such a manner that when said window pane is in contact with said stopper member, said resiliently deformable hollow strip contacts to the upper periphery of said window pane establishing watertight sealing therebetween.

9. A window seal construction as claimed in claim 1, in which said supporting member is connected to said side roof rail structure through an elongate retainer to which said elongate weatherstrip is secured.

10. In a motor vehicle having a side roof rail structure which bounds an upper side of a door opening, a drip channel extending along said side roof rail structure to catch rain water which runs down on a roof of the vehicle, a drip mold extending along the drip channel to conceal the same and including at least two segments which are joined to each other, a sashless type door hinged to the vehicle to open or close the door opening, a window pane held by the door in a manner to move between raised and lowered positions, first means for causing an upper edge of said window pane in the raised position to move along a first direction when said door is normally swung to open or close the door opening, and second means for causing the upper edge of said window pane in the raised position to move outwardly along a second direction when a lower pressure area is created at the outer surface of the vehicle body, a window seal construction which comprises:

an elongate weatherstrip secured to said side roof rail structure and extending along the same, said weatherstrip contacting sealingly with an upper peripheral portion of the window pane in the raised position upon closing of the door;

a supporting member secured to said roof rail structure and having an elongate flange portion which straddles the window pane in the raised position and extends along the side roof rail structure leaving a space between the upper edge of the window pane in the raised position and the elongate flange portion of the supporting member; and an elongate stopper member of resiliently deformable material secured to said elongate flange portion of the supporting member and extending along the same, said stopper member being positioned to interfere with said second direction but not interfere with said first direction, said stopper member being integrally formed with an outwardly projected lip portion which is resiliently contacted to outer surfaces of the joined portions of the drip mold segments.

11. A window seal construction for a vehicle door having a side rail structure which bounds an upper side of an opening for the door, a window pane held by said door in a manner to be movable between raised and lowered positions, first means for causing an upper edge of said window pane in the raised position to move along a first direction when said door is normally opened or closed, and second means for causing the upper edge of said window pane in the raised position to move outwardly along a second direction when a lower pressure area is created at the outer surface of the window pane, said construction comprising:

an elongate weatherstrip secured to said rail structure and extending along the same, said weatherstrip having a sealing contact with an upper peripheral portion of the window pane in the raised position upon closing the door;

a supporting member secured to said rail structure and having an elongate flange portion which straddles the window pane in the raised position and extends along the rail structure leaving a space between the upper edge of the window pane in the raised position and the elongate flange portion of said supporting member; and an elongate stopper member of resiliently deformable material secured to said elongate flange portion of the supporting member and extending along the same, said stopper member positioned to interfere with the window being moved in said second direction but not interfere with the window being moved in said first direction, said stopper member being integrally formed with an outwardly projected lip portion, a water absorptive strip being fixed to the stopper member at a position slightly above said lip portion with respect to the window pane in the raised position and extends along the stopper member, thus producing a watertight seal between the window pane and the elongate stopper member.

12. A window seal construction as claimed in claim 11, in which said water absorptive strip is made of sponge.

13. A window seal construction as claimed in claim 12, in which said supporting member is connected to said side rail structure through an elongate retainer to which said elongate weatherstrip is secured.

* * * * *